Nov. 11, 1941.    J. L. DOWNES    2,262,171
HOSE COUPLING TOOL
Filed July 6, 1938    2 Sheets-Sheet 1
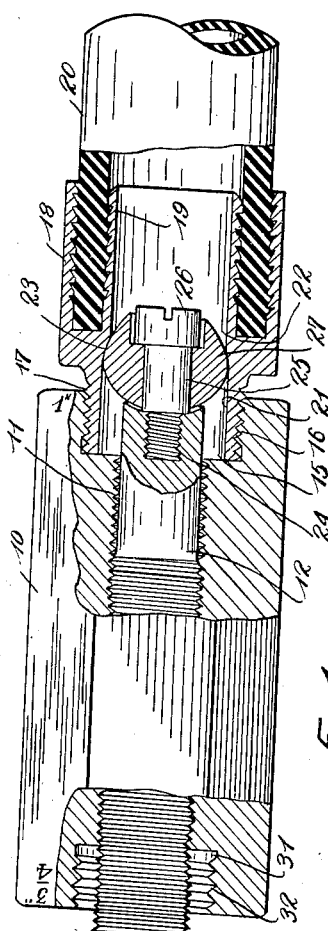
Fig. 1
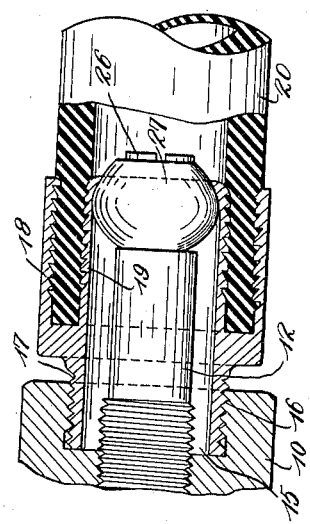
Fig. 2
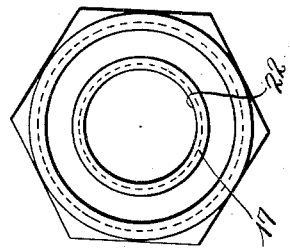
Fig. 4
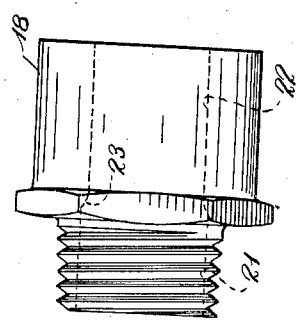
Fig. 3
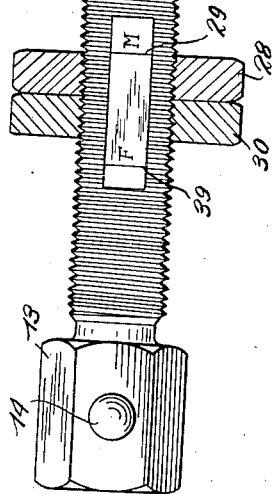
INVENTOR.
JAMES L. DOWNES
BY
Kwis Hudson Kent
ATTORNEYS Nov. 11, 1941.      J. L. DOWNES      2,262,171
HOSE COUPLING TOOL
Filed July 6, 1938      2 Sheets-Sheet 2
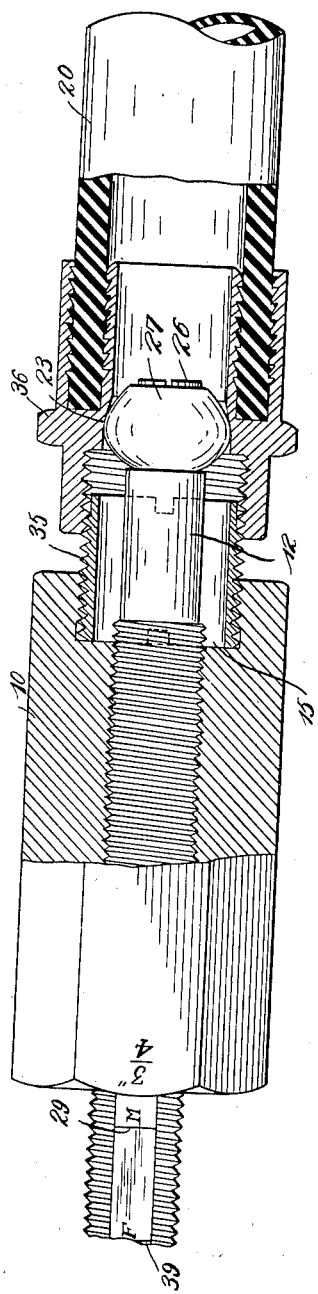
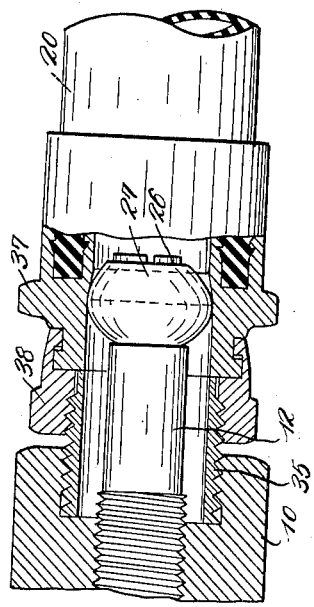
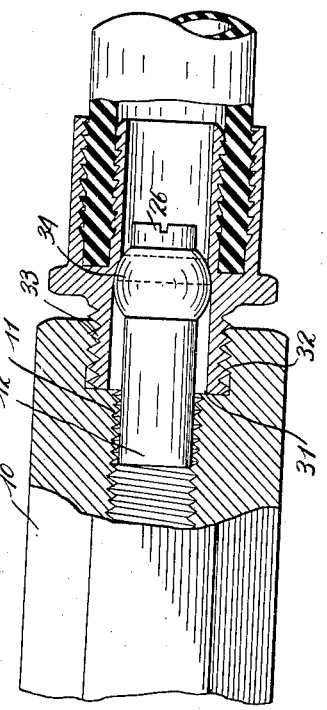
INVENTOR.
JAMES L. DOWNES
BY
ATTORNEYS Patented Nov. 11, 1941

2,262,171

UNITED STATES PATENT OFFICE 2,262,171

HOSE COUPLING TOOL

James L. Downes, Cleveland, Ohio, assignor to International Metal Hose Co. Inc., Cleveland, Ohio, a corporation of Delaware Application July 6, 1938, Serial No. 217,801

2 Claims. (Cl. 29—88.2)

This invention relates to improvements in hose coupling tools, and has to do with a simple hand tool for expanding the inner wall of a hose coupling while in place on the end of a piece of hose, thereby causing the hose to be gripped tightly between the inner and outer walls of the coupling.

One of the objects of the invention is the provision of a tool of this character which shall be adaptable to use with couplings of a variety of types and sizes.

Another object is the provision of a tool which shall so operate upon the coupling as to leave the bore thereof substantially the same as that of the hose upon which it is mounted.

Other objects and features of novelty will appear as I proceed with the description of those embodiments of the invention which, for the purposes of the present application, I have illustrated in the accompanying drawings, in which Fig. 1 is an elevational view, partly in central longitudinal section, of a tool embodying the invention shown attached to a coupling and ready to perform its expanding function.

Fig. 2 is a fragmental sectional view of the same with the tool substantially at the end of its expanding operation.

Figs. 3 and 4 are side and end views respectively of that form of coupling which is illustrated in Figs. 1 and 2.

Fig. 5 is a view similar to Fig. 1 showing the tool in position to act upon a coupling of a different type.

Fig. 6 is a fragmental view showing the tool in position to act upon still another type of coupling.

Fig. 7 is a view similar to Fig. 1 but showing the operating bar reversed and supplied with a smaller size expanding ball to act upon a coupling of smaller size.

The body of the tool consists of a barrel 10 the outer surface of which is preferably hexagonal in order that it may be conveniently held against turning, as for example in a vise. This barrel is bored out axially and provided with an internal left-hand thread 11, which is adapted to receive the left-hand thread on an operating bar 12. At its rear end this bar may be provided with a hex head 13 for the reception of a wrench, and it may also have a perforation through which a round rod 14 may be extended, the wrench or the rod serving as a crank by means of which the bar 12 may be turned. Obviously, the bar 12 may be rotated by power if desired, as for instance by an electric motor through reduction gearing, not shown.

In each end of the barrel 10 there are threaded parts concentric with the threaded bore 11, by means of which couplings may be attached to the barrel. In the case illustrated in Fig. 1 the section shown at the right-hand end of the figure comprises a socket 15 formed with a right-hand thread 16 for the reception of an externally threaded shank 17 on a male coupling. When the shank of the coupling is threaded tightly into the socket 15 the coupling is firmly attached to the barrel 10 of the tool. The hose gripping portion of the coupling consists of an outer cylindrical wall 18 and an inner cylindrical wall 19, these two walls being concentric and being formed with teeth on their opposing surfaces. The teeth on the wall 19 however terminate short of the end of the wall, which is formed with a radius as a protection against cutting the hose during use. The end of a piece of hose 20 may be inserted into the coupling between the walls 18 and 19 before the coupling is expanded. The couplings as manufactured have a bore 21 in the shank portion which is somewhat larger than the bore 22 of the inner wall 19, the two bores being connected by a short taper 23. Bore 21 is substantially the same in diameter as the inner diameter of hose 20.

In the forward end of bar 12 there is a threaded axial hole for the reception of a threaded shank 24 on a stud 25 provided with a slotted head 26. On the smooth body portion of stud 25 there is rotatably mounted a hardened steel ball 27 of approximately the same diameter as the bore 21. By threading the bar 12 forwardly through the barrel 10 the hardened ball 27 is forced to exert pressure against the taper 23, pushing the taper ahead and thereby expanding the inner wall 19 progressively and making the bore thereof the same as that of the shank 17, as shown in Fig. 2. I preferably stop the advance of ball 27 before its maximum circumference has reached the end of the inner wall 19, that is to say at about the position illustrated in Fig. 2, the approximately spherical shape of the ball 27 imparting an inward curve to the end of the wall 19, so that the annular opening between the walls is somewhat flared, thereby contributing to the ease of bending of the hose and reducing to a minimum the cutting effect of the coupling at its juncture with the hose. The expansion of wall 19 by ball 27 serves to compress that part of the hose which is gripped and to force it into the interstices between the teeth of the inner and outer walls, thereby forming a firm connection and a fluid-tight joint.

The advancing movement of the ball 27 may be stopped at precisely the desired position, indicated in Fig. 2, by means of a stop nut 28 the forward face of which is caused to register with a gauge mark 29 formed in a flattened space on the bar. A lock nut 30 may then be threaded up into tight engagement with nut 28 to hold the latter against accidental movement. The gauge mark 29 is so positioned that when the bar 12 has been threaded forward to an extent sufficient to advance the ball 27 to the position of Fig. 2, nut 28 will engage the rear end of barrel 10 and stop further forward movement of bar 12.

The present tool is designed to handle couplings of two different sizes, in the present instance those known as 1" couplings and those known as ¾" couplings. The coupling connection formed in the end of the barrel opposite socket 15 is illustrated in Fig. 1 as consisting of a second socket 31 of smaller diameter than socket 15, provided with a right-hand thread 32 which is adapted to receive a threaded shank 33 on a ¾" coupling.

When the tool is to be set up for handling these smaller couplings, stud 25 is removed with ball 27, threaded bar 12 is withdrawn from the barrel by turning it clockwise and then reinserted into the barrel from the opposite end. When the bar has been thus moved forward to project from the barrel through socket 31, a smaller ball 34 is mounted on stud 25 and the stud is then screwed back into place in the end of the bar. The tool is then ready to operate in the same manner as before but upon smaller couplings. The length of these two couplings, being approximately the same, no change in the setting of the stop nut 28 will be required.

Now, when it is desired to use the tool upon female couplings I employ an adapter which consists of an externally threaded pipe nipple 35, which may be obtained in any plumbing supply store. Such a nipple is illustrated herein only in connection with the 1" coupling, but it will be appreciated that the same kind of adapter may be employed in the case of ¾" couplings. The adapter is threaded into the socket 15 or 31, as the case may be, and the female coupling is then threaded onto the adapter. A solid coupling 36 of this kind is shown mounted on the adapter in Fig. 5, while in Fig. 6 the coupling 37 has a threaded swivel part 38 which is mounted on the adapter. As will be obvious upon an inspection of these figures, the functions and operation of the tool are the same in this case as in the case of the male couplings. Because of the interposition of the adapter 35 the ball 27 must advance further from the end of barrel 10 in order to expand a female coupling than in the case of the male couplings, and the gauge mark 39 indicates where the stop nut 28 should be set in order to properly limit the travel of the ball for female couplings.

Left-hand threads are used upon the bar 12 and upon the stud 25, so that in case the ball 27 should rotate with the stud 25 it will tend to force the coupling more tightly into the barrel 10 instead of loosening it. However, the stud 25 is intended to turn freely within the ball, and to advance the ball into the coupling without rotation of the ball.

In cases where it is not essential to have the tool adaptable for operation upon two different sizes of couplings, one end of barrel 10 may be fitted with an internal thread and the other end fitted with an external thread, in which case the adapter 35 will not be required, one end of the barrel being then utilized exclusively for male couplings and the other end being utilized exclusively for female couplings.

Having thus described my invention, I claim:

1. A hand tool for expanding the inner wall of a hose coupling having a threaded coupling end thereon, comprising an elongated barrel of metal having a longitudinal threaded bore extending from end to end thereof, said bore including a threaded counterbore of larger diameter at one end thereof which is adapted to threadedly receive the threaded end of a coupling to hold the same attached to said barrel, a screw bar threaded into the smaller diameter portion of said bore and projecting from both ends of said barrel, and the end of said screw bar adjacent said counterbore being provided with a removable head adapted, upon operation of said screw bar, to expand the inner wall of a coupling held by said barrel.

2. A hand tool for expanding the inner wall of a hose coupling having a threaded coupling end thereon, comprising an elongated barrel of metal having a longitudinal threaded bore extending from end to end thereof, said bore including a threaded counterbore of larger diameter at one end thereof which is adapted to threadedly receive the threaded end of a coupling to hold the same attached to said barrel, a screw bar threaded into the smaller diameter portion of said bore and projecting from both ends of said barrel, the end of said screw bar adjacent said counterbore being provided with a removable head adapted, upon operation of said screw bar, to expand the inner wall of a coupling held by said barrel, and a nut adjustably mounted on the screw bar beyond the opposite end of said barrel constituting a stop adapted to engage the barrel for limiting the travel in one direction of the screw bar in the barrel.

JAMES L. DOWNES.